United States Patent [19]
Khalifa et al.

[11] Patent Number: 5,426,994
[45] Date of Patent: Jun. 27, 1995

[54] STEERING COLUMN TILT MECHANISM

[75] Inventors: Mustafa A. Khalifa, Dearborn; Kenneth Budowick, Warren; Roger A. DeWulf, Mt. Clemens, all of Mich.

[73] Assignee: Chrysler Corporation, Highland Park, Mich.

[21] Appl. No.: 155,372

[22] Filed: Nov. 22, 1993

[51] Int. Cl.⁶ .................. B62D 1/18; F16B 21/00
[52] U.S. Cl. .................... 74/493; 280/775; 403/106; 403/108; 403/321; 403/325
[58] Field of Search .............. 74/493; 280/775; 403/325, 324, 321, 108, 107, 106

[56] References Cited

U.S. PATENT DOCUMENTS

| | | |
|---|---|---|
| 2,830,464 | 4/1958 | Winterbauer . |
| 2,873,822 | 2/1959 | Sloan . |
| 3,691,866 | 9/1972 | Berkes . |
| 4,018,101 | 4/1977 | Mihalic . |
| 4,075,903 | 2/1978 | Cornell . |
| 4,244,236 | 1/1981 | Sylvester . |
| 4,265,139 | 5/1981 | Logemann . |
| 4,279,176 | 7/1981 | Minamitani ............ 74/493 |
| 4,476,741 | 10/1984 | Yamaguchi ............ 280/775 X |
| 5,025,679 | 6/1991 | Yamamoto ............ 74/493 |

Primary Examiner—Charles A. Marmor
Assistant Examiner—Troy Grabow
Attorney, Agent, or Firm—Edward A. Craig

[57] ABSTRACT

A tilt mechanism for a steering column of a vehicle includes a first bracket fixedly attached to a sleeve of the steering column and a second bracket pivotally attached to the first bracket and operatively connected to a rotatable steering wheel of the steering column. The tilt mechanism also includes a latching member pivotally attached to the second bracket and having a plurality of apertures. The tilt mechanism has a release lever pivotally attached to the first bracket. A latch pin is disposed between the release lever and the latching member for engaging the latching member to restrain the second bracket from rotational movement and for disengaging the latching member to allow rotational movement of the second bracket.

11 Claims, 2 Drawing Sheets

STEERING COLUMN TILT MECHANISM

BACKGROUND OF THE INVENTION

1. Field of the Invention

The present invention relates generally to steering columns for vehicles and, more particularly, to a tilt mechanism for a steering column of an automotive vehicle.

2. Description of the Related Art

In a steering column of an automotive vehicle, a steering shaft has a steering wheel at one end. The steering shaft is extended through a rigid sleeve and rotatable therein. The steering column may be of a tilt or non-tilt type.

In a conventional tilt steering column, the rigid sleeve is held in place by a pair of brackets attached to vehicle structure and the steering shaft has two separate shafts connected by a pivot mechanism adjacent the steering wheel. The pivot mechanism has a structure for allowing the steering wheel to be placed in a plurality of tilt positions. The tilt steering column allows an operator of the vehicle to adjust height and angle of the steering wheel depending on the operator's stature, seat position, and comfort. Typically, the tilt steering column also allows for an exit position, whereby the steering wheel is placed in an uppermost position to allow easier ingress and egress to the vehicle.

On some current tilt steering columns, the tilt mechanism uses two pivoting toothed pawls, an anchor pin, an engagement spring, and a release lever. When a vehicle is front impacted, the force of the impact is transmitted to the steering column causing the tilt mechanism to release. Due to the large return spring on the tilt mechanism, the steering wheel moves to its upper most position. When this happens, the steering wheel is in an unfavorable position with respect to the occupant for deployment of an airbag.

One disadvantage of the above steering column tilt mechanism is that it lacks positive engagement to control the position of the steering wheel relative to an occupant during a front impact of the vehicle. Another disadvantage is that the steering column tilt mechanism lacks a desired strength during a front impact of the vehicle. Thus, there is a need in the art to provide a steering column tilt mechanism which has more positive engagement and increased strength.

SUMMARY OF THE INVENTION

It is, therefore, one object of the present invention to provide a steering column tilt mechanism for an automotive vehicle.

It is another object of the present invention to provide a steering column tilt mechanism which provides increased strength and allows a more secure and greater number of tilt positions.

It is yet another object of the present invention to provide a steering column tilt mechanism that controls the position of the steering wheel relative to the occupant during a front impact of the vehicle.

It is a further object of the present invention to provide a steering column tilt mechanism that reduces the possibility of release during a front impact of the vehicle.

To achieve the foregoing objects, the present invention is a tilt mechanism for a steering column of a vehicle. The tilt mechanism includes a first bracket fixedly attached to a sleeve of the steering column and a second bracket pivotally attached to the first bracket and operatively connected to a rotatable steering wheel of the steering column. The tilt mechanism also includes a latching member pivotally attached to the second bracket and having a plurality of apertures. The tilt mechanism further includes a release lever pivotally attached to the first bracket and means disposed between the release lever and latching member for engaging said latching member to restrain the second bracket from rotational movement and for disengaging the latching member to allow rotational movement of the second bracket.

One advantage of the present invention is that a tilt mechanism is provided for a steering column of an automotive vehicle. Another advantage of the present invention is that the steering column tilt mechanism provides a through-pin for more positive engagement. As a result, impact induced axial loads in the steering column shaft cannot cause the pin to release because the pin is orientated at an angle of ninety degrees (90°) to this axial load and provides increased strength of the tilt mechanism to the steering column. Yet another advantage of the present invention is that the steering column tilt mechanism prevents release of the tilt mechanism during a front impact of the vehicle and permits the steering wheel to remain in a position that allows the airbag to deploy more effectively relative to the occupant.

Other objects, features and advantages of the present invention will be readily appreciated as the same becomes better understood after reading the subsequent description taken in conjunction with the accompanying drawings.

DESCRIPTION OF THE PREFERRED EMBODIMENT(S).

Figure 1:
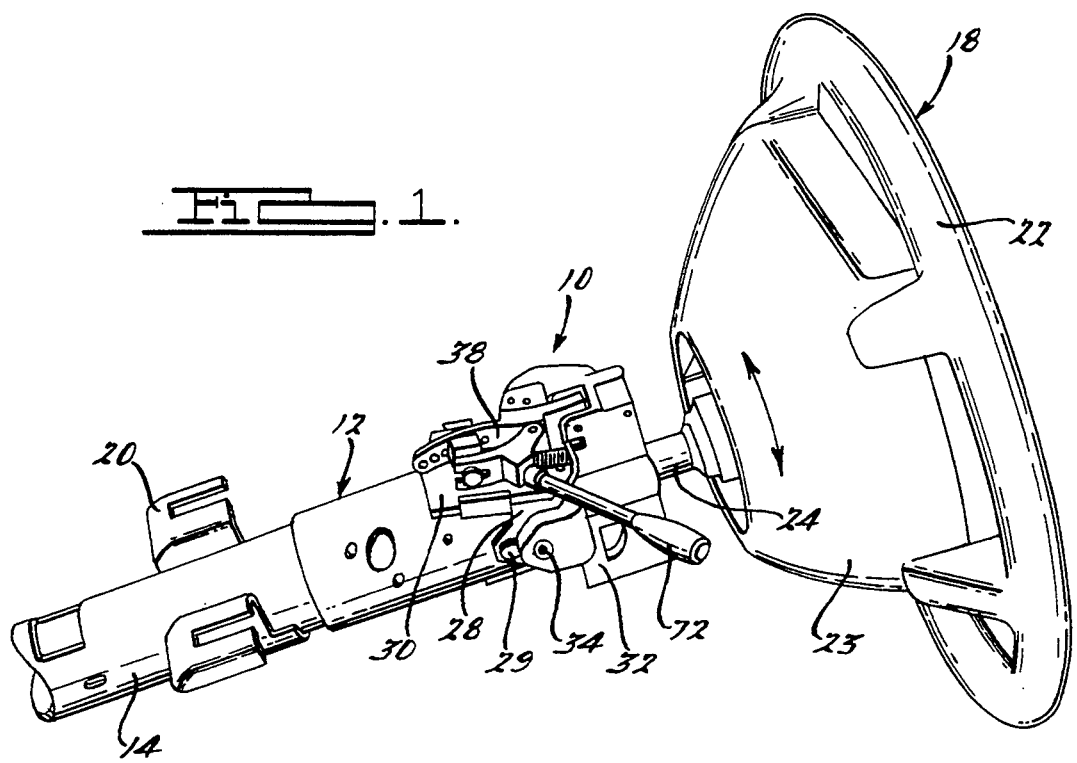
FIG. 1 is a perspective view of a tilt mechanism, according to the present invention, illustrated in operational relationship with a steering column of a vehicle.
Figure 2:
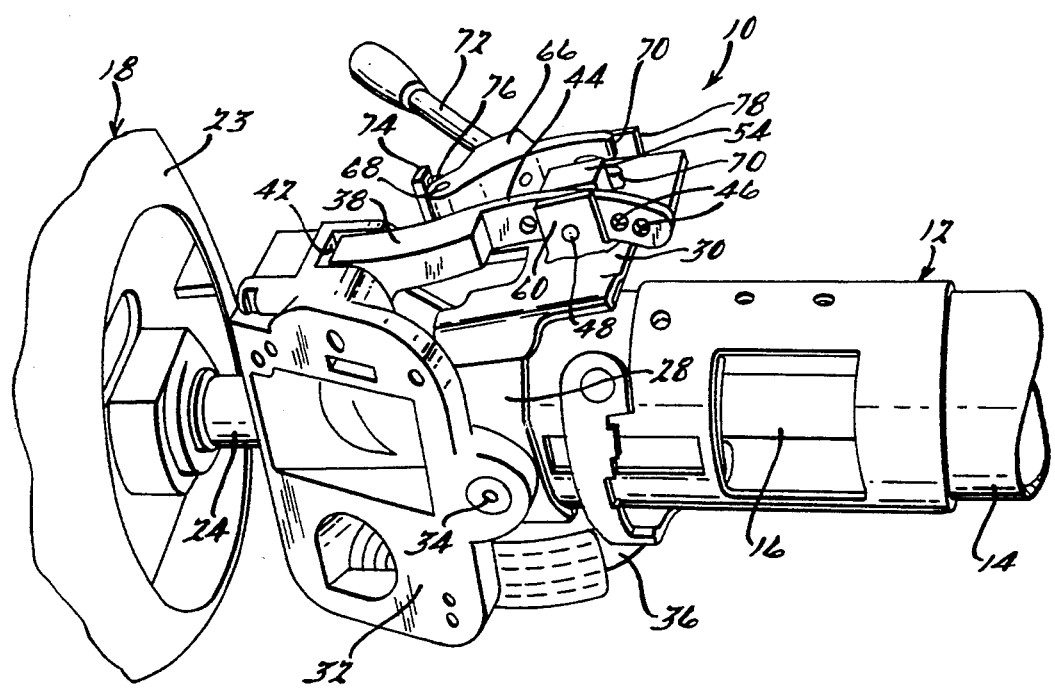
FIG. 2 is an elevational view of the tilt mechanism of the steering column of FIG. 1.

Referring now to the drawings, especially to FIGS. 1 and 2, a tilt mechanism 10, according to the present invention, is illustrated in operational relationship with a steering column, generally indicated at 12, for a vehicle such as an automotive vehicle (not shown). The steering column 12 includes a rigid sleeve 14 and a steering shaft 16 which extends through the rigid sleeve 14 and is connected to a steering wheel assembly, generally indicated at 18, at its upper end and to a shaft coupler (not shown) at its lower end. It should be appreciated that the shaft coupler is operably connected to a steering gear assembly (not shown) for steering of wheels of the vehicle. The steering column 12 also includes a bracket 20 attached to the sleeve 14 by suitable means such as welding for fixedly mounting and securing the sleeve 14 to vehicle structure such as a dash assembly (not shown) of the vehicle.

Figure 3:
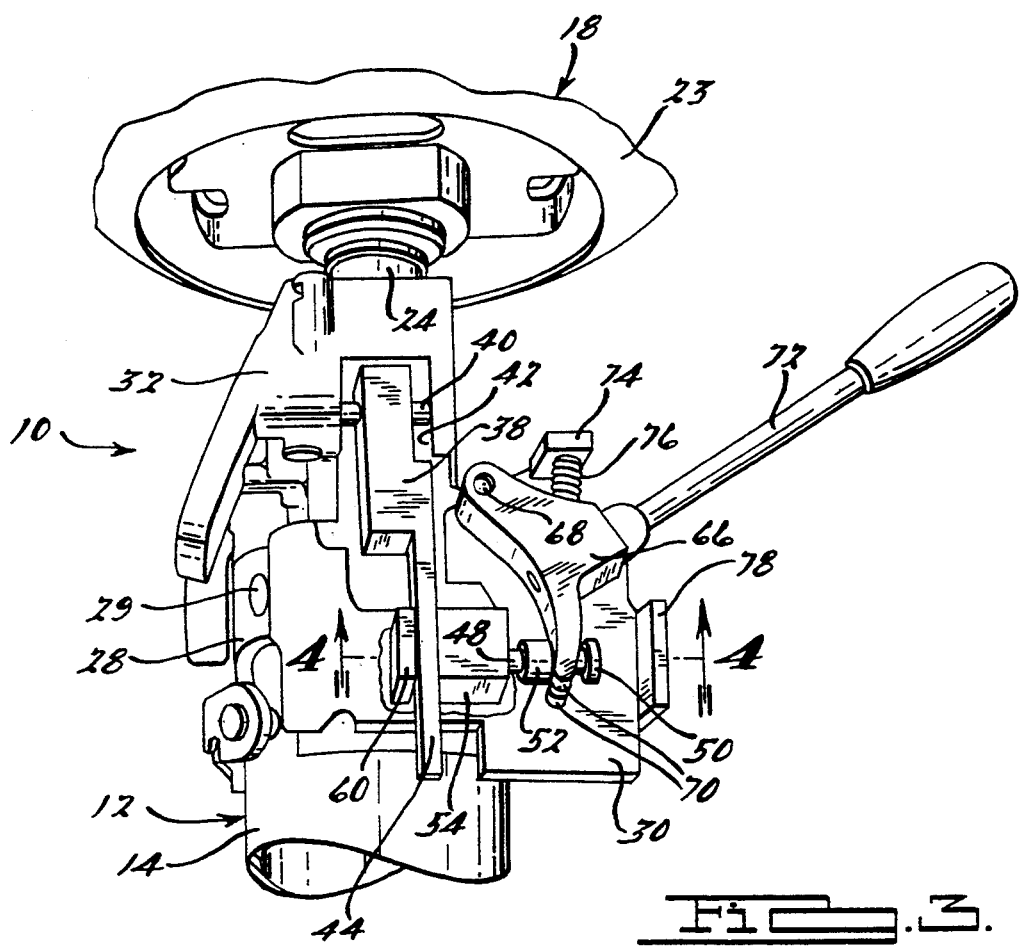
FIG. 3 is a plan view of the tilt mechanism of the steering column of FIG. 1.

Referring to FIGS. 1 through 3, the steering wheel assembly 18 includes a steering wheel 22 connected by a bracket 23 to a wheel shaft 24. The wheel shaft 24 is hinged or coupled to the steering shaft 16 by a coupler (not shown). It should be appreciated that the coupler is conventional and known in the art to allow the wheel shaft 24 to pivot or rotate relative to the steering shaft 16.

The tilt mechanism 10 includes a first bracket 28 secured to the sleeve 14 by suitable means such as rivets 29. The first bracket 28 forms a saddle which is disposed about the sleeve 14 and has an extension 30 extending axially away from the steering wheel assembly 18. It should be appreciated that the first bracket 28 is fixed relative to the sleeve 14.

The tilt mechanism 10 also includes a second bracket 32 pivotally secured to the first bracket 28 by suitable means such as pins 34. The pins 34 allow the second bracket 32 to pivot or rotate upwardly and downwardly relative to the first bracket 28. The tilt mechanism 10 includes a spring 36 interconnecting the second bracket 32 and the sleeve 14 to urge the second bracket 32 in an uppermost position relative to the first bracket 28. It should be appreciated that the wheel shaft 24 extends through the second bracket 32 and pivots or rotates with the second bracket 32.

Figure 4:
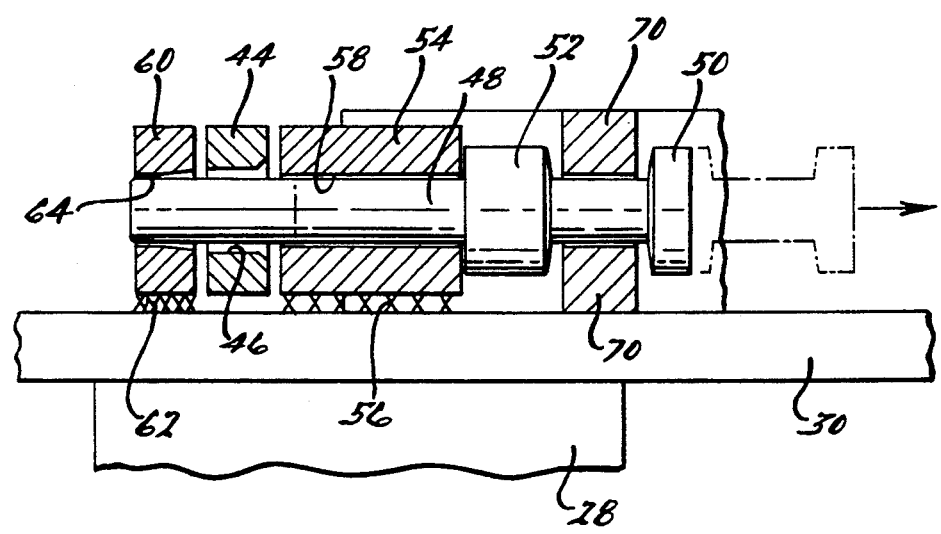
FIG. 4 is a sectional view taken along line 4—4 of FIG. 3 illustrating engaged and disengaged positions.

Referring to FIGS. 3 and 4, the tilt mechanism 10 also includes a latching member 38 pivotally mounted on a pin 40 to the second bracket 32. The second bracket 32 has a recess 42 in an upper portion thereof. One end of the latching member 38 is disposed in the recess 42. The pin 40 extends through the one end of the latching member 38 and the recess 42 and is secured by suitable means such as press-fitting in the second bracket 32. The latching member 38 has an axially extending arm portion 44. The arm portion 44 of the latching member 38 is generally arcuate in shape and has a plurality of openings or apertures 46 extending therethrough. The apertures 46 are generally circular in shape. The apertures 46 are spaced axially relative to each other to provide a predetermined number of locking or tilt positions. It should be appreciated that the apertures 46 receive a latch pin 48 to be described.

The tilt mechanism 10 includes a latch pin 48 for engaging and disengaging the apertures 46 in the latching member 38. The latch pin 48 extends longitudinally and has a generally circular cross-sectional shape. The latch pin 48 has a first and second flanges 50 and 52 for a function to be described. The first flange 50 is an enlarged diameter and located at one end thereof and the second flange 52 is an enlarged diameter spaced longitudinally from the first flange 50. Preferably, the latch pin 48 is made from a metal material such as cold rolled steel. It should be appreciated that the other end of the latch pin 48 and the flanges 50 and 52 have chamfers for allowing smooth engagement.

The tilt mechanism 10 also includes a pin retaining block 54 to support the latch pin 48. The pin retaining block 54 is generally rectangular in shape and secured to the extension 30 of the first bracket 28 by suitable means such as welding 56. The pin retaining block 54 has an aperture 58 extending longitudinally therethrough to receive the latch pin 48. The tilt mechanism 10 includes a guide block 60 spaced longitudinally from the pin retaining block 54. The guide block 60 is generally rectangular in shape and secured to the extension 30 by suitable means such as welding 62. The guide block 60 has an aperture 64 extending longitudinally therethrough to receive the end of the latch pin 48. The guide block 60 restrains the arm portion 44 and prevents lateral movement thereof such that the arm portion 44 moves substantially axially.

The tilt mechanism 10 further includes a release lever 66 pivotally mounted at one end to the extension 30 of the first bracket 28 by suitable means such as a pin 68. The release lever 66 is arcuately shaped and has a pair of fingers 70 spaced vertically to form a saddle or U-shape to receive the latch pin 48. The fingers 70 are disposed between the flanges 50 and 52. The release lever 66 also includes a handle 72 threadably attached thereto to allow an operator to move the release lever 66 for a function to be described. The tilt mechanism 10 further includes a spring block 74 secured to the extension 30 by suitable means such as welding. The tilt mechanism 10 includes a return spring 76 disposed between the return lever 66 and spring block 74 and connected thereto to urge the fingers 70 toward the pin retaining block 54. The tilt mechanism 10 also includes a stop 78 secured to the extension 30 by suitable means such as welding to stop or limit movement of the latch pin 48.

In operation, when the handle 72 is manually pulled toward the steering wheel 22 by an operator, the release lever 66 is rotated counter-clockwise or axially toward the steering wheel 22 such that the fingers 70 contact the first flange 50 of the latch pin 48. The applied pressure from the release lever 66 on the latch pin 48, overcomes the force of the return spring 76, rotating the release lever 66 counter-clockwise and moving the latch pin 48 longitudinally to disengage the apertures 46 in the latching member 38 for an unlocked position as illustrated by phantom lines in FIG. 4. The steering wheel assembly 18 is then manually rotated and repositioned by the operator as desired. When the handle 72 is then released by the operator, thereby releasing the release lever 66, the return spring 76 causes the release lever 66 to rotate clockwise such that the fingers 70 contact the second flange 50 of the latch pin 48. The applied pressure from the release lever 66 on the latch pin 48 moves the latch pin 48 into one of the apertures 46 of the arm portion 44 of the latching member 38 for a locking position as illustrated in solid lines in FIG. 4. It should be appreciated that the latch pin 38 moves a predetermined distance such as 0.5 inches.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tilt mechanism for steering column of a vehicle comprising:
   a first bracket fixedly attached to a sleeve of a steering column;
   a second bracket pivotally attached to said first bracket and operatively connected to a rotatable steering wheel of the steering column;
   a latching member pivotally attached to said second bracket and having a plurality of apertures;
   a release lever pivotally attached to said first bracket; and
   means disposed between said release lever and said latching member for engaging said latching member to restrain said second bracket from rotational movement and for disengaging said latching element to allow rotational movement of said second bracket;

said means comprising a latch pin and said latch pin having first and second flanges.

2. A tilt mechanism as set forth in claim 1 wherein said release lever has a pair of spaced fingers to receive said latch pin and disposed between said first and second flanges thereof.

3. A tilt mechanism as set forth in claim 2 wherein said latch pin is slideably attached to said first bracket and orientated at an angle of substantially ninety degrees to said latching member to engage and disengage said apertures.

4. A tilt mechanism as set forth in claim 2 including a pin retaining block secured to said first bracket and having a first aperture extending therethrough to receive said latch pin.

5. A tilt mechanism as set forth in claim 4 wherein said latching member has an arm portion extending axially and being disposed adjacent said pin retaining block.

6. A tilt mechanism as set forth in claim 5 including a guide block spaced from said pin retaining block and secured to said first bracket, said arm portion being disposed between said guide block and said pin retaining block.

7. A tilt mechanism as set forth in claim 2 including a return spring operatively associated with said release lever for urging said release lever toward said latching member.

8. A tilt mechanism for a steering column of a vehicle, the steering column including a fixed sleeve and a steering wheel assembly pivotal relative to said sleeve, comprising:

a first bracket fixedly attached to the sleeve;

a second bracket pivotally attached to said first bracket and operatively connected to the steering wheel assembly;

a latching member pivotally attached to said second bracket and having a plurality of apertures;

a release lever pivotally attached to said first bracket;

a latch pin slideably attached to said first bracket and connected to said release lever for engaging said apertures of said latching member in a locking position to restrict pivotal motion of said second bracket and said steering wheel assembly and disengaging said apertures of said latching member in an unlocked position to allow pivotal motion of said second bracket and said steering wheel assembly;

said latch pin having first and second flanges and said release lever having a pair of spaced fingers to receive said latch pin and being disposed between said first and second flanges thereof.

9. A tilt mechanism as set forth in claim 8 wherein said latch pin is orientated at an angle of substantially ninety degrees to said latching member to engage and disengage said apertures.

10. A tilt mechanism as set forth in claim 8, and further including a pin-retaining block secured to said first bracket, a guide block spaced from said pin-retaining block and secured to said first bracket, said pin-retaining block and said guide block having aligned apertures, and said latching member extending between said blocks in a position such that one of the apertures therein is aligned with the apertures in said blocks for receiving said latch pin in the aligned apertures.

11. A tilt mechanism as set forth in claim 10 including a return spring operatively associated with said release lever for urging said release lever toward said latching member.

* * * * *